US012499702B2

(12) United States Patent
Hron, II

(10) Patent No.: US 12,499,702 B2
(45) Date of Patent: Dec. 16, 2025

(54) SYSTEM AND METHOD FOR UNSUPERVISED DOCUMENT ONTOLOGY GENERATION OF CORPUS OF DOCUMENTS AND PARTITIONING THE DOCUMENTS BASED ON PARTITIONING PARAMETER

(71) Applicant: Thomson Reuters Enterprise Centre GmbH, Zug (CH)

(72) Inventor: Joel M. Hron, II, The Woodlands, TX (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 345 days.

(21) Appl. No.: 18/130,647

(22) Filed: Apr. 4, 2023

(65) Prior Publication Data

US 2023/0326222 A1    Oct. 12, 2023

Related U.S. Application Data

(60) Provisional application No. 63/329,172, filed on Apr. 8, 2022.

(51) Int. Cl.
*G06V 30/413*   (2022.01)
*G06V 10/762*   (2022.01)
(Continued)

(52) U.S. Cl.
CPC .......... *G06V 30/413* (2022.01); *G06V 10/762* (2022.01); *G06V 30/416* (2022.01);
(Continued)

(58) Field of Classification Search
None
See application file for complete search history.

(56) References Cited

U.S. PATENT DOCUMENTS 10,339,375 B2 *   7/2019   Castillo ................. G06F 40/295
2006/0242180 A1   10/2006   Graf et al.
(Continued)

OTHER PUBLICATIONS

PCT App. No. PCT/US2023/017430, International Search Report and Written Opinion, Jun. 14, 2023, 9 pages.

*Primary Examiner* — Haris Sabah
(74) *Attorney, Agent, or Firm* — Gregory P. Durbin; Polsinelli PC

(57) ABSTRACT

Aspects of the present disclosure involve an automated, machine-learning technique for generating a representation of an ontology of a corpus of documents. This unsupervised generation of the ontology of the content of the documents may describe, based on the semantics of the language in the corpus and on the structure and format of the documents in that corpus, potentially key differentiable topics and sub-topics within the documents and the potential relationship between the topics and sub-topics. The unsupervised, or automated, generation of the ontology may provide a foundation of potential topics and sub-topics of a corpus of documents from which a complete ontology for the corpus of documents may be created. This ontology may be both pertinent in defining a structure through which an end user may interpret the data identified from a document or set of documents and/or to inform a machine-learning model to extract document information and classification.

15 Claims, 6 Drawing Sheets

(51) Int. Cl.
*G06V 30/416* (2022.01)
*G06V 30/14* (2022.01)
*G06V 30/19* (2022.01)

(52) U.S. Cl.
CPC ............... *G06T 2207/30144* (2013.01); *G06V 30/1444* (2022.01); *G06V 30/19173* (2022.01)

(56) References Cited

U.S. PATENT DOCUMENTS

| | | |
|---|---|---|
| 2006/0248053 A1 | 11/2006 | Sanfilippo et al. |
| 2013/0232147 A1 | 9/2013 | Mehra et al. |
| 2015/0161248 A1 | 6/2015 | Majkowska |
| 2015/0269431 A1* | 9/2015 | Haji ................ G06V 40/30 382/186 |
| 2017/0004208 A1 | 1/2017 | Podder et al. |
| 2020/0311113 A1* | 10/2020 | Gao ................ G06F 16/3344 |
| 2020/0327172 A1* | 10/2020 | Coquard ........... G06F 16/9035 |
| 2021/0303838 A1* | 9/2021 | Sickert ............. G06V 30/413 |

* cited by examiner

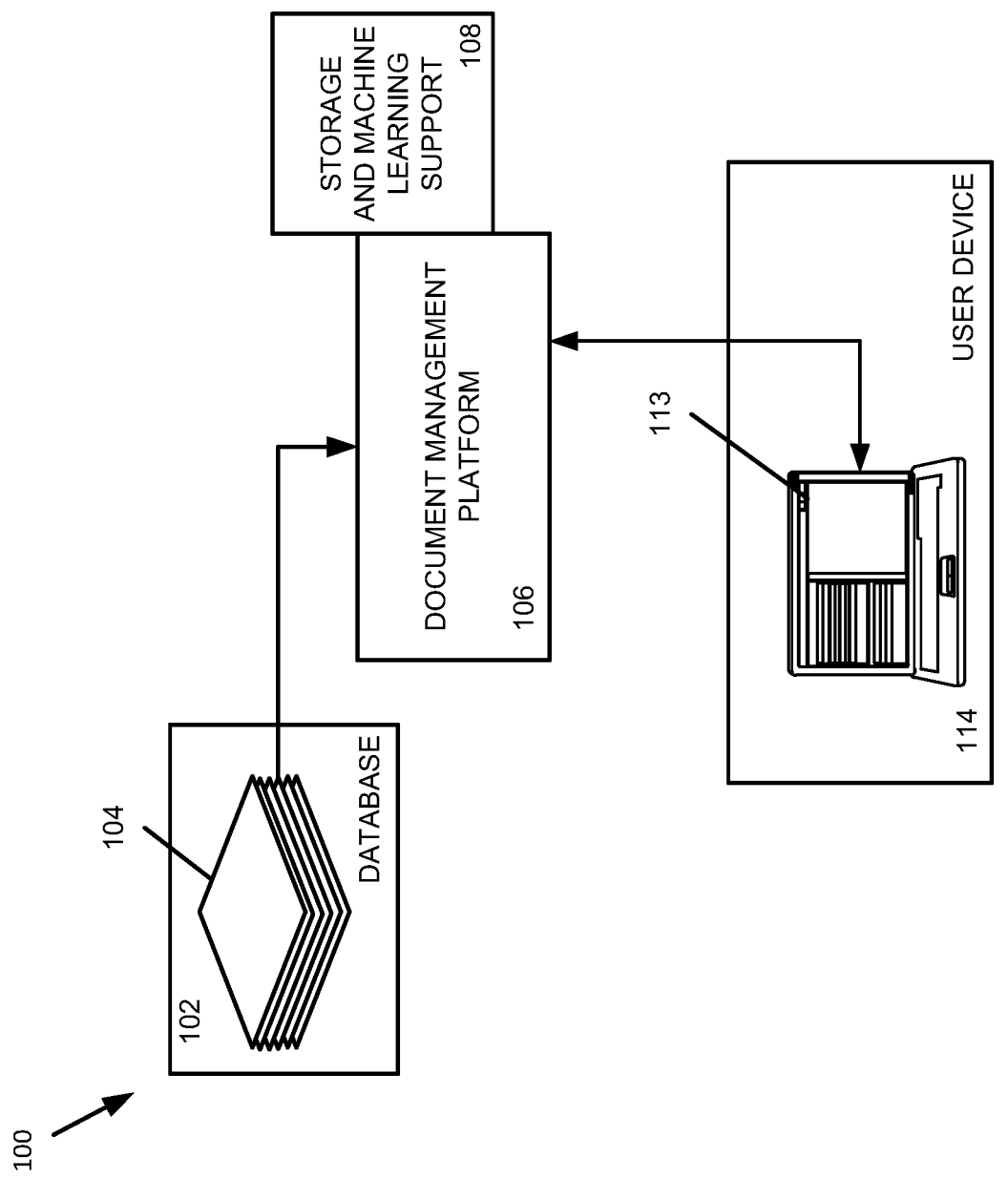

SYSTEM AND METHOD FOR UNSUPERVISED DOCUMENT ONTOLOGY GENERATION OF CORPUS OF DOCUMENTS AND PARTITIONING THE DOCUMENTS BASED ON PARTITIONING PARAMETER

CROSS-REFERENCE TO RELATED APPLICATION

This application is related to and claims priority under 35 U.S.C. § 119(e) from U.S. Patent Application No. 63/329,172 filed Apr. 8, 2022 entitled "System and Method for Unsupervised Document Ontology Generation", the entire contents of which is incorporated herein by reference for all purposes.

FIELD

The present disclosure relates to processing of documents, and in particular, to identifying common occurrences of contextually similar language and structure in a corpus of documents and automatically grouping those common occurrences into like entity structures and sub-structures.

BACKGROUND and INTRODUCTION

In nearly any relatively large organization, whether it be a corporate organization, governmental organization, educational organization, etc., document management is important but very challenging for a myriad of reasons. To begin, in many organizations the sheer number of electronic documents is challenging. In many situations, organizations employ document management systems and related databases that may provide tools to organize documents. Various attributes of a document may be identified at the creation of the document. For example, a user may name the document, and store the document in a file structure that implicitly relates the document with other documents, which may be based on any number of relational and/or hierarchical characteristics including the type of document, a project, the creator of the document, etc. However, at creation, it is quite possible that none or few of these attributes may be associated with a document. Documents may also be categorized during a procurement phase that occurs after the initial document is created. Overall, whether at creation or during a later procurement, organizations often expend great resources reviewing and/or categorizing documents so that that those documents can be discovered in a search or otherwise identified at a later time based on information associated with each document.

In the majority of situations, however, document organization is a manual process. For example, many organizations manually associate, whether at creation, when uploaded into a system, or at some point later, attributes or metadata with each document that describe particular aspects of the stored electronic document. These manually applied attributes serve to aid end users in grouping and organizing information and identifying related documents. In one particular example, an ontology of a document may be manually created by a user during uploading of the document. In the area of document management (particularly in the field of complex document and contract models where many provisions and sub-provisions exist), an ontology may describe a hierarchy of topics and sub-topics by which pertinent topics can be abstracted for a greater understanding of the contents of the document or documents. However, the process of ontology creation is often incomplete for a variety of reasons, including a user having an incomplete understanding of the document necessary for proper definition, attribution tools being insufficient for proper and complete attribution, simple lack of prioritization or understanding of the importance of some topics or sub-topics, human error, and any number of other issues. In even a high functioning environment, a user may simply have insufficient knowledge about a document, or the information may simply not yet be knowable.

It is with these observations in mind, among others, that aspects of the present disclosure were conceived.

SUMMARY

Embodiments of the disclosure concern document management systems and methods. A first embodiment includes a method for generating an ontology for a corpus of documents. The method may include the operations of accessing, by a processor and from a database, a plurality of electronic documents, partitioning, based on a partitioning parameter, each of the plurality of electronic documents into a plurality of partitions, and computing, by the processor, a word sequence embedding vector for each of the plurality of partitions. The method may also include the operations of clustering, based on a clustering parameter, the word sequence embedding vectors into one or more clusters of corresponding vectors and assigning a subset of the plurality of partitions corresponding to a cluster of corresponding vectors to an ontology topic tier for the plurality of electronic documents.

Another embodiment includes a system for aggregating related documents. The system may include a processor and a memory comprising instructions that, when executed, cause the processor to perform operations. Such operations may include partitioning, based on a partitioning parameter, each of the plurality of electronic documents into a plurality of partitions, computing, by the processor, a word sequence embedding vector for each of the plurality of partitions, and clustering, based on a clustering parameter, the word sequence embedding vectors into one or more clusters of corresponding vectors. The instructions may also cause the processor to associate a subset of the plurality of partitions corresponding to a cluster of corresponding vectors to an ontology topic tier for the plurality of electronic documents and generate a graphical user interface including a first portion displaying a visual representation of the plurality of partitions.

Yet another embodiment includes one or more non-transitory computer-readable storage media storing computer-executable instructions for performing a computer process on a computing system. The computer process may include the operations accessing, by a processor and from a database, a plurality of electronic documents, partitioning, based on a partitioning parameter, each of the plurality of electronic documents into a plurality of partitions, and computing, by the processor, a word sequence embedding vector for each of the plurality of partitions. The computer process may further include clustering, based on a clustering parameter, the word sequence embedding vectors into one or more clusters of corresponding vectors and assigning a subset of the plurality of partitions corresponding to a cluster of corresponding vectors to an ontology topic tier for the plurality of electronic documents.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

FIG. 1 is a system diagram for a document management system for generating an unsupervised document ontology for one or more digital documents, in accordance with various embodiments.

DETAILED DESCRIPTION

Figure 2A:
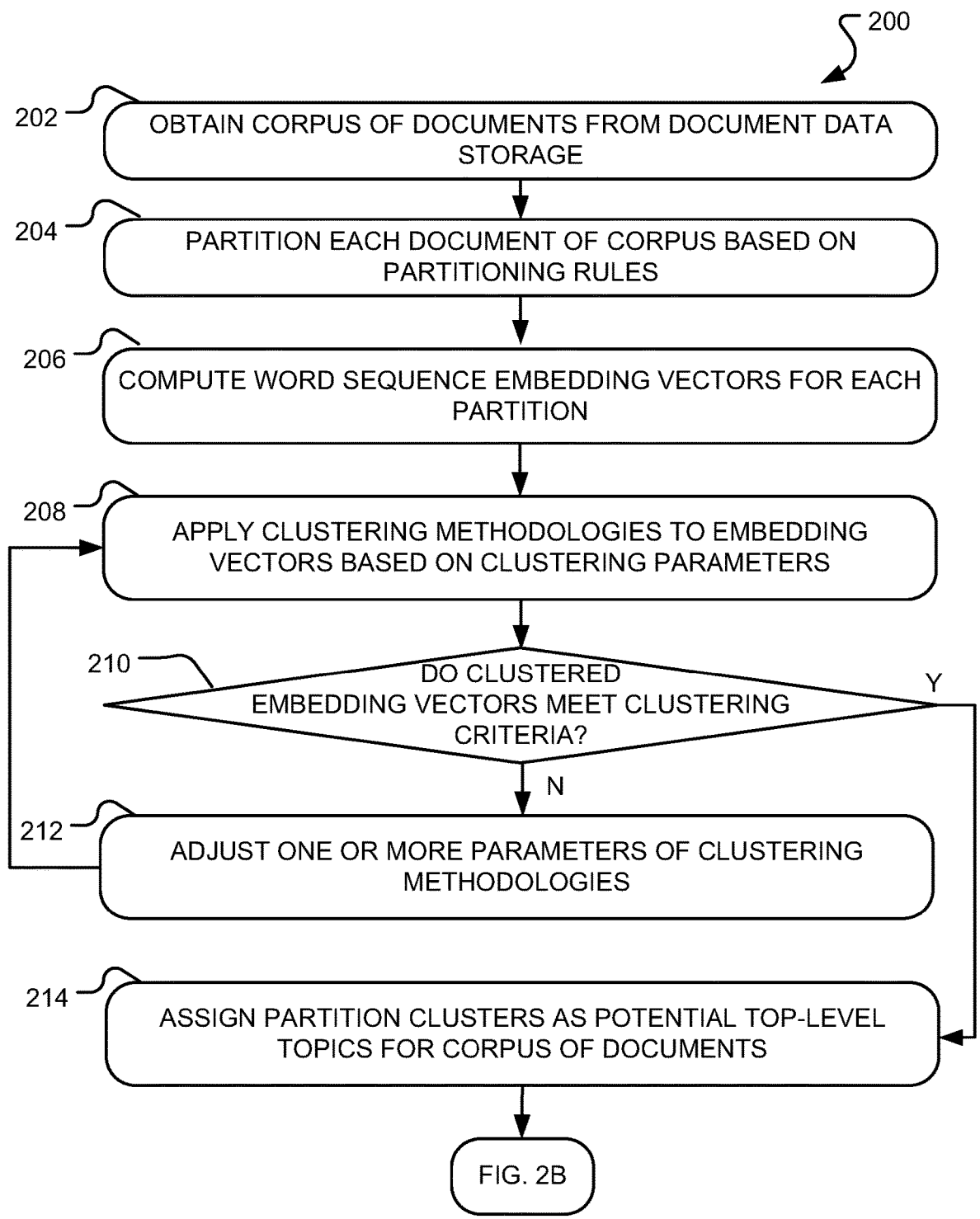
FIGS. 2A and 2B illustrate a flowchart of a method for generating an unsupervised ontology for one or more documents of a document management system, in accordance with various embodiments.

Aspects of the present disclosure involve systems and methods for an automated, machine-learning technique for generating a representation of an ontology of a corpus of documents. This unsupervised generation of the ontology of the content of the documents may describe, based on the semantics of the language in the corpus and on the structure and format of the documents in that corpus, potentially key differentiable topics and sub-topics within the documents and the potential relationship between the topics and sub-topics. In one implementation, the unsupervised, or automated, generation of the ontology may provide a foundation of potential topics and sub-topics of a corpus of documents from which a complete ontology for the corpus of documents may be created. This ontology may be both pertinent in defining a structure through which an end user may interpret or "read" the data identified from a document or set of documents and/or to inform machine-learning model or models used to extract document information and classification. Lastly, the ontology itself may be used as a model in associating topics and creating rule sets for how these topics may interrelate and what information can be inferred from those relationships.

Generally, the creation of the definition or schema of the ontology is a highly iterative process that includes both an understanding of the domain of interest (i.e. document type (such as a contract), the types of topics discussed within a document, and the potential use cases for how a document is to be interpreted or evaluated) and an understanding of the language that represents each of the topics within the ontology and how that language is semantically correlated. This understanding of the semantic correlation may aid a system in determining how to architect a model or models to identify information and may inform whether a topic should be sub-divided into multiple entities within the ontology or kept together as one. In other words, the semantic correlation may aid a system in determining if the topics identified through the ontology process are easily differentiable by a machine-learning model given the corpus of language data available that represents those topics.

Typical ontology generating techniques are manual in nature and may include a user identifying the map of topics and sub-topics within a document or documents based on their knowledge of the content of the corpus of documents. However, such a process may be time-consuming and error-prone for users having an incomplete understanding of the document necessary for proper definition. Other drawbacks may include attribution tools being insufficient for proper and complete attribution and/or a large volume of documents to be analyzed to generate the ontology, further extending the time needed to generate the ontology. Such an ontology process may therefore be improved through the use of an automated, machine-learning representation of an ontology that generates, based on the semantics of the language in a corpus of documents and on the structure and format of the documents in that corpus, the key differentiable topics and sub-topics of the documents and how such topics and sub-topics may relate.

Described herein is a system and method for an unsupervised and automated machine-learning representation for the generation of an ontology of a corpus of documents. In one implementation, the system may analyze a corpus comprising a document or set of documents and partition each of the documents of the corpus based on one or more partitioning rules. For example, each document may be partitioned based on paragraph breaks included in the document such that each paragraph becomes a partition of the respective document. Other partitioning schemes may also be applied, such as partitioning the document based on sections or headings, partitioning based on lines, partitioning based on sentences, among other considerations. Once partitioned, word sequence embedding vectors may be generated for each of the partitions of each of the documents through a vector generating technique. Word sequence embedding may include language modeling and feature learning techniques in which words from a vocabulary (and possibly phrases thereof) may be mapped to vectors of real numbers in a space that is low-dimensional relative to the vocabulary size. In some particular implementations, the word sequence embedding may include methods such as the continuous bag-of-word (CBOW) modeling and the continuous skip-gram modeling that leverage the surrounding context of a word in documents to transform words into vectors (i.e., word embeddings) in a continuous space, which may capture both semantic and syntactic relationships between words. Regardless of the sequence embedding technique utilized, one or more vectors may be generated from the partitions of the documents in the corpus.

Upon generation of the word sequence embedding vectors of the partitions, one or more clustering methodologies may be applied to the vectors to cluster like partitions (or more accurately, like vectors generated from those partitions) together. In some instances, the clustering techniques may be optimized or conditioned in a variety of ways. For example, a clustering technique may include a parameter that defines each cluster containing a certain number of partitions to ensure its efficacy as a concept that transcends the entire corpus. Another clustering parameter may define that every document in the corpus contain at least one instance of each partition. In this manner, the clustering techniques may include particular parameters to generate a more accurate or efficient clustering of the word sequence embedding vectors generated from the partitions of the documents in the corpus.

In one implementation, the clustered partitions (based on the vectors generated from the partitions) may be labeled or otherwise noted as top-level concepts (also referred to herein as "topics") for the corpus of documents. Notably, the identification of the topics may be generated automatically and without input from a user or reader of the documents.

Further, the above techniques and operations may be repeated for each identified cluster. In particular, techniques and operations may be applied to further partition each cluster and analyze the partitions of each cluster to derive sub-topics for each cluster until some stopping criteria is met (i.e., span lengths less than some amount, cluster variance, etc.). The result of this recursive process is an automatically generated hierarchy of concepts, of either or both topics and sub-topics, that represent differentiable semantic concepts of the corpus of documents. In some instances, the clusters of partitions generated through this process may be displayed or otherwise returned to a user interface. For example, the clusters may be represented visually through a word cloud or other representation of the words of the partitions for each topic and/or sub-topic. In another example, key term frequencies of each topic and/or sub-topic may be displayed to provide some sense of the concept being represented by the clusters.

Beginning at FIG. 1, an example document management system for identifying common occurrences of contextually similar language and structure in a corpus of documents and automatically grouping those common occurrences into like entity structures and sub-structures is shown. The system 100 may receive or otherwise gain access one or more electronic documents 104 through a file system, a database, and the like. The system described herein may be used with any type of electronic document, such as an electronic book, report, memo, output of a monitoring sensor or device, email, and the like. In addition, the documents may be in any known or hereafter developed format, including structured and unstructured formats. For purposes of illustrating various aspects of the present disclosure, the electronic document 104 is a legal document, such as a contract between two or more parties.

It should be recognized that the document, when first loaded to or accessed by the system 100, may be in the form of an image file (e.g., PDF, JPG, PNG, etc.) from which the system extracts text. In some embodiments, the system may receive one or more images of, for example, documents related to a contract or other type of document. Such documents may include clauses, sections, paragraphs, or other text or group of text related to the document type. In some cases, the received image document may have been pre-processed to extract the text and thus includes the text level information. Text extraction can be done by various tools available on the market today falling within the broad stable of Optical Character Recognition ("OCR") software.

The system may store the image files or documents 104 in a database 102. The database 102 can be a relational or non-relational database, and it will be apparent to a person having ordinary skill in the art which type of database to use or whether to use a mix of the two. In some other embodiments, the document may be stored in a short-term memory rather than a database 102 or be otherwise stored in some other form of memory structure. As discussed in more detail below, the documents 104 stored in the system database 102 may be used later for training new machine-learning models and/or continued training of existing machine-learning models.

A document management platform 106 may communicate with and access one or more documents 104 from the database 102 to automate a machine-learning representation of an ontology of a corpus of the stored electronic documents 104. In general, the document management platform 106 can be a computing device embodied in a cloud platform, locally hosted, locally hosted in a distributed enterprise environment, distributed, combinations of the same, and otherwise available in different forms. In some instances, the document management platform 106 may access the documents 104 to partition a corpus of documents, determine vectors for each of the partitions, and cluster the vectors based on one or more clustering parameters, as described in more detail below. The clustered vectors may then be assigned as a top-level topic for the corpus of documents. In addition, the document management platform 106 may recursively apply the same process as outlined above for further partitioning of each cluster and analyzing the partitions of each cluster to derive sub-topics for each cluster. This recursive process may continue until some stopping criteria are met. As described in more detail below, a storage and machine learning support system 108 may be used by the document management platform 106 to aid in altering a machine-learning model for generating the ontology for the corpus. Also, a user computing device 114 may be in communication with the document management platform 106 for executing a user interface 113 to interact with the document management platform. Use of the components of the system 100 of FIG. 1 are described in more detail below.

Figure 2B:
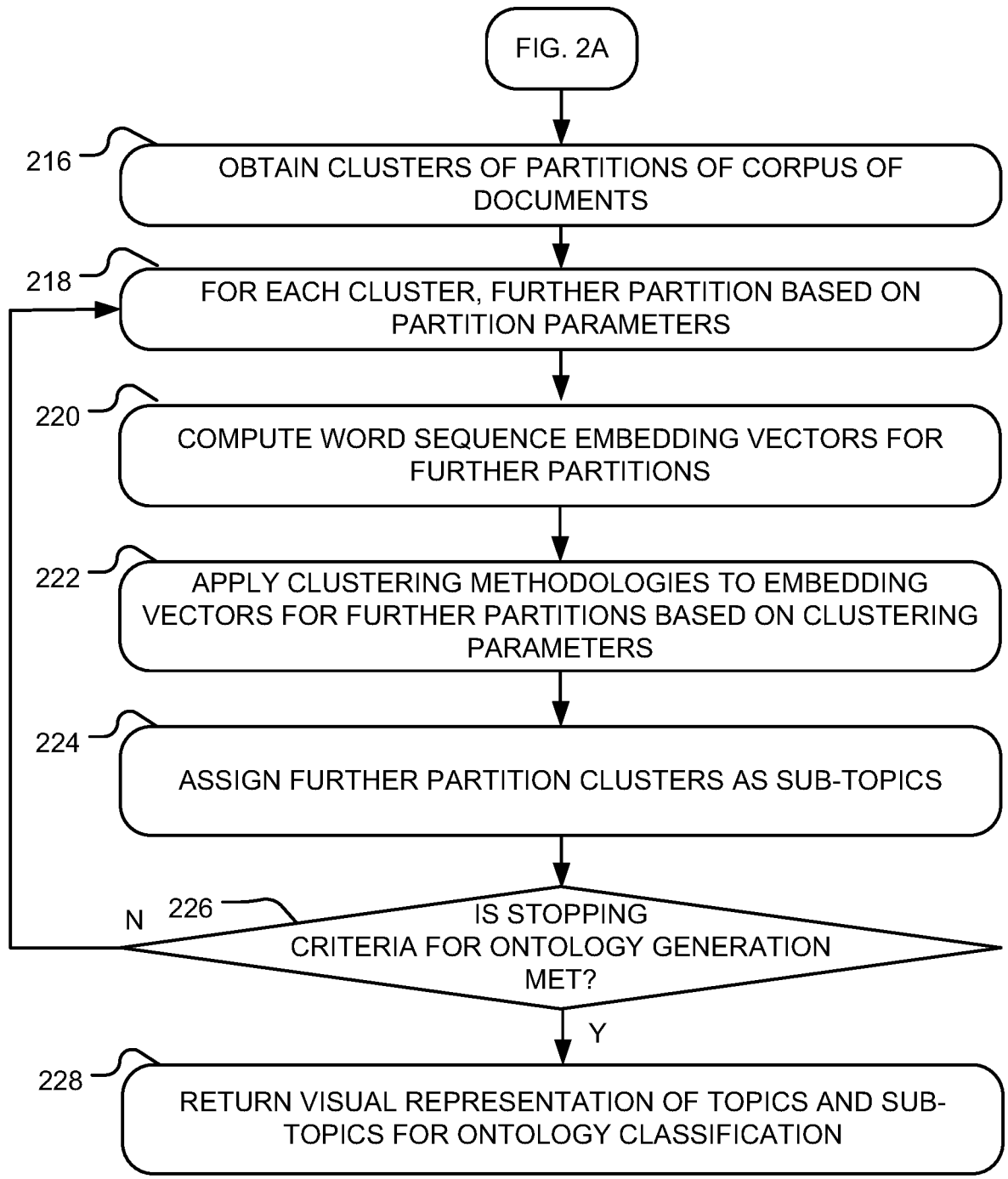

FIGS. 2A-2B illustrate a flowchart of a method 200 for generating such an unsupervised and automated machine-learning representation for the generation of an ontology of a corpus of documents 104 of the database 102. In one implementation, the operations of the method 200 may be performed by the document management platform 106, although other computing devices or groups of computing devices may perform the operations. In another implementation, the operations may be executed by the document management platform 106, the computing device 114 on which the user interface 113 is executed, or a combination of both. Through the method 200, an ontology of the corpus of documents may be generated in an automatic and unsupervised manner related documents may be identified and displayed on the user interface 113.

Beginning at step 202, the document management platform 106 may obtain a corpus of documents 104 from a storage 102 of documents. In one example, the documents 104 may comprise or be related to a legal document, such as a contract between two or more parties, a contract defining a business deal, and the like. Other types of documents are also contemplated. The corpus may include any number of documents that may or may not be related. As mentioned above, the documents may be received as a word processing file, may be an image file from which text is extracted, or may take another electronic form. In general, the corpus of documents 104 may be any type of computer file from which text may be determined or analyzed. In one particular example used herein, the corpus of documents may be related as some or all of the documents supporting a contract between two parties, with each document including an aspect of the contract between the parties.

Figure 3:
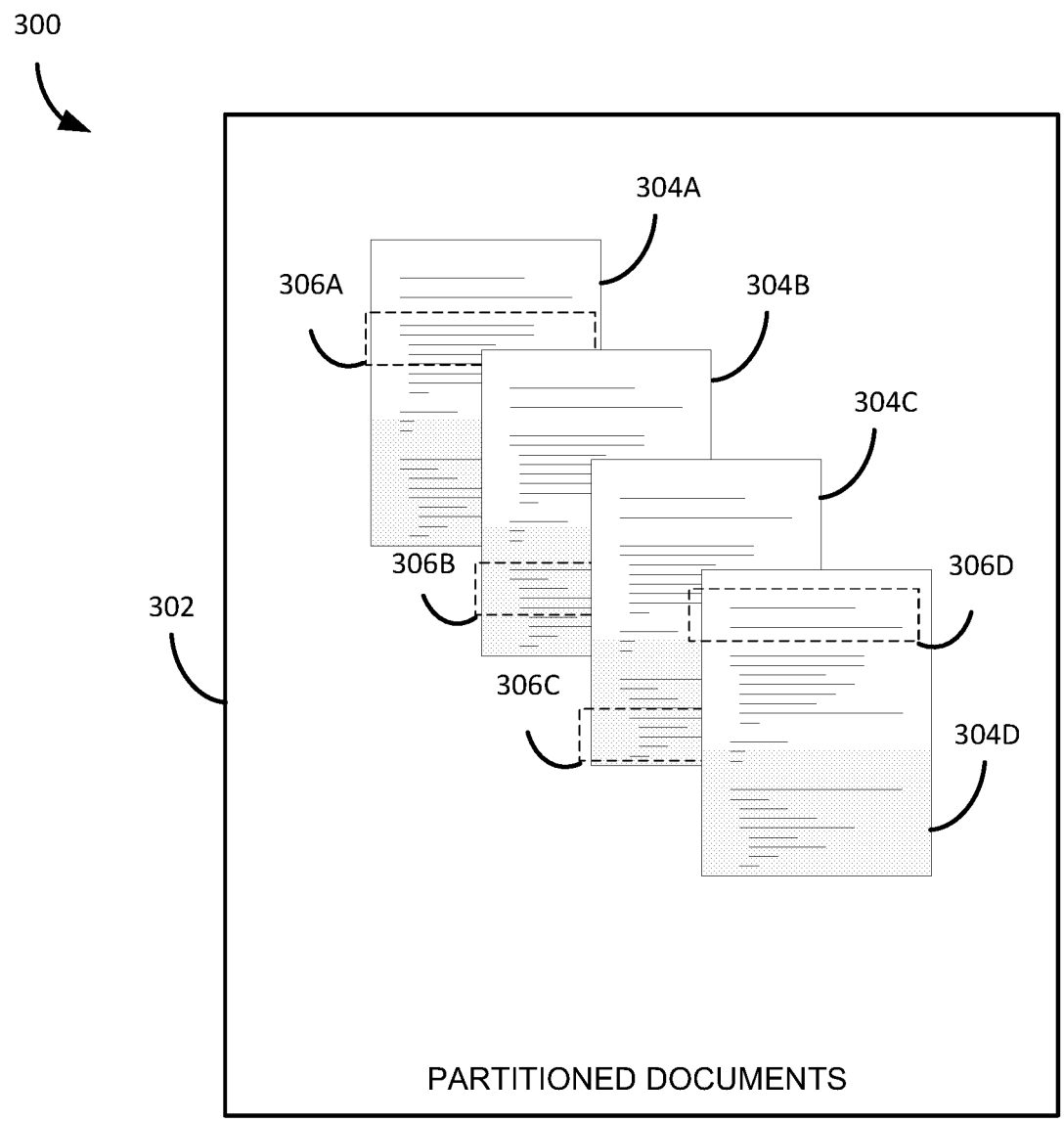
FIG. 3 is an illustration of a partitioning of documents in a corpus of documents, in accordance with various embodiments.

At step 204, each document of the corpus 104 may be partitioned based on one or more partitioning rules or parameters. For example, FIG. 3 is an illustration of a partitioning of documents 302 in a corpus of documents, in accordance with various embodiments. In the illustration shown, the corpus may include documents 304A-304D. Each document 304A-D may include at least one partition, illustrated as partition 306A-D. The partition, in general, is a defined portion of a document, such as a page of text, a paragraph of text, an image within the document, a section of text, or any other related portion of a document or documents. Further, all or a portion of each of the documents 304A-D may be included in a partition. More particularly, the entirety of each document 304A-D may be included in a partition, or only a portion of each of the documents may included in a partition. Further, less than all of the documents in the corpus may include a particular partition 306A-D. As illustrated in FIG. 3, partition 306A-306D may be identified as included in a partition of the documents 304A-304D or may be separate partitions. Other partitions of the documents 304A-304D may also be identified within the corpus.

Partitioning of each document 304A-D in the corpus may occur in many ways. For example, each document 304A-D may be partitioned 306A-D based on paragraph breaks within the documents. Thus, a computing device may analyze the contents of the corpus of documents to identify paragraph breaks, such as through an identification of metadata within the document (such as new line breaks) that indicate a paragraph break, through optical analysis of the document to identify indentions that indicate a new paragraph, and the like. In another example, partitioning of the documents 304A-D may be based on topic sections of the document, indicated by headings or titles setting off the sections. Other partitioning schemes may partition each sentence (as indicated by a period in the text), partitioning by page, partitioning by embedded section breaks within the metadata, and the like. Further, the partitioning technique may include parameters for formatting of the documents 304A-D. For example, a document may be partitioned such that a bulleted list is included in a paragraph above or below the list. In another example, the bulleted list may be partitioned as a standalone paragraph or partition. Partitioning of a graph or table of a document may include extracting the text from the graph or table and including the extracted text into a paragraph or as a standalone partition. In an alternative partitioning scheme, a windowing feature may be included that defines a partition as a span of x number of words or word-piece tokens. The windowing alternative may be configured to include some amount of overlap between the partitions 306A-D. The windowing feature may also be defined as a span of lines of the document, span of pages of the document, or any other characteristic of a document. In general, any portion of a document or group of documents may be partitioned such that the partitions may be of any size. However, the partitions are typically some portion of the content of a document or documents that is related.

At step 206, a word sequence embedding vector may be computed or generated for each of the partitions of each of the documents of the corpus. The word sequence embedding vectors may be generated through any technique for generating a vector from a block of text. In a simple example, a hash value may be generated from the text of the partitions using a hashing technique. However, more sophisticated vectors may be generated from the partitioned blocks of text. In general, word sequence vectoring may include language modeling and may feature learning techniques in which words from a vocabulary (and possibly phrases thereof) may be mapped to vectors of real numbers in a space that is low-dimensional relative to the vocabulary size. In some particular implementations, generating the word sequence embedding vectors may include methods such as the continuous bag-of-word (CBOW) modeling and the continuous skip-gram modeling that leverages the surrounding context of a word in documents to transform words into vectors (i.e., word embeddings) in a continuous space, which may capture both semantic and syntactic relationships between words. For example, the word sequence embedding vectors corresponding to a particular type of clause of a contract between the two parties may be generated using such techniques, such as a representations and warranties clause of the contract. As several such clauses may be present in the corpus of documents scattered throughout the various documents of the corpus, multiple word sequence embedding vectors may be generated based on those partitions. Further, the word sequence embedding vectors for the partitions may or may not include similar vector values. Regardless of the sequence embedding technique utilized, one or more vectors may be generated from the partitions of the documents in the corpus. Through this process, a vectorized form of the partitions of the documents may be generated that include an ordered number of numerical values corresponding to the text and the contextual or semantic meaning of the text of the partitions.

At step 208, one or more clustering techniques may be applied to the generated word sequence embedding vectors to cluster like or similar vectors together. To cluster the like or similar word sequence embedding vectors, any number or types of clustering algorithms may be applied to the vectors to identify similarities along a variety of factors. Various cluster analysis algorithms may be used, such as K-means, though other algorithms will be apparent to a person of ordinary skill in the art. Generally, a clustering technique may utilize unsupervised machine-learning to create groups of word sequence embedding vectors and thus may determine similarity based on factors unlikely or even impossible to be considered by a human analyst, such as, e.g., cosine similarity of vectorized documents. Continuing the above example, clustering of the vectors may gather together similar clauses in a contract, such as representation and warranties clauses of the contract that may be included in several documents. The clustering therefore collects partitions of the documents, such as a contract, that are similar or contextually related. Clustering may be performed along two-dimensions, three-dimensions, or more. As the word sequence embedding vectors generated above correspond to the text and the contextual or semantic meaning of the text of the partitions, clustering of said vectors may collect partitions that are similar in text and contextual meaning.

One or more clustering parameters or rules may be applied through the clustering techniques discussed above and a verification that one or more clustering criteria are met or achieved may be determined at step 210. For example, the clustering techniques may be configured to require that each cluster contains a certain number of partitions (or more particularly, a certain number of vectors corresponding to a partition) to ensure an efficacy that a concept included in the clustered vectors transcend the entire corpus of documents. In one particular example, the clustering techniques may be configured to ensure that each vector is clustered with at least one other vector. Another clustering parameter may ensure that every document in the corpus of documents include at least one instance of each clustered partition or word sequence embedding vector. Still another clustering parameter or rule may ensure that the determined clusters account for a certain percentage of the overall population of partitions or the overall variance of the partition population. In general, any number of criteria may be used to ensure an effective clustering of the word sequence embedding vectors or partitions of the documents. In some implementations, the clustering parameters and/or criteria may be received at the document management platform 106 via a user interface 113 executed on a user device 114. In this manner, the clustering techniques may be fine-tuned or adjusted for greater efficiency and accuracy in clustering the word sequence embedding vectors generated from the document partitions.

If it is determined that the clustered word sequence embedding vectors do not satisfy one or more of the clustering criteria, one or more parameters of the clustering methodologies may be adjusted at step 212. For example, a clustering parameter value may be adjusted, either automatically or through the user interface 113, to include more word sequence embedding vectors into one or more clusters. The adjusted parameter value may be randomly selected or may be selected to include at least a certain amount of word sequence embedding vectors. The adjusted parameter may therefore be more inclusive to include more word sequence embedding vectors in an effort to satisfy the clustering criteria. Following the adjustment to the parameters, the clustering methodologies may be reapplied to the word sequence embedding vectors to generate a new cluster of the vectors. The process of clustering the word sequence embedding vectors and adjusting the parameters of the clustering methodologies may be repeated until the one or more clustering criteria are met.

At step 214, the clustered word sequence embedding vectors may be assigned or otherwise indicated as a top-level topic for the corpus of the documents. These top-level topics may correspond to a top-level of an ontology for the corpus of documents. In particular and as noted above, the word sequence embedding vectors may be derived from or otherwise correspond to partitions of the documents of the corpus. Thus, similar partitions of the documents may be collected into clusters through the clustering of the word sequence embedding vectors. These clusters may correspond to common topics or sections of text within the documents of the corpus. As such, each cluster may be assigned as a potential top-level topic for the ontology of the corpus of documents as the clustering of the word sequence embedding vectors indicate those partitions of the documents that occur throughout the text of the documents. Continuing the above example, clustered partitions may relate to a representations and warranties clause or clauses of a contract document. The clustered partitions may be associated with an indication that the partitions are a top-level topic (such as a subheading of a contract or clause of a contract) of an ontology of the corpus. Further, a heading or other portion of the clustered partitions may be identified and applied to the cluster to aid in identifying the content of the clustered partitions. For example, the clustered partitions may be labeled as representative of representations and warranties clauses of a contract document. In other instances, the clustered partitions may be indicated as a top-level topic, without assigning a label to the content of the partitions. Rather, a label to the content of the partitions may be received from a user interface 113, as explained in more detail below. In some instances, each of the clustered word sequence embedding vectors may be converted back into the corresponding partition or a representation of the corresponding partition as a part of assigning the vectors as the potential top-level topic of the ontology. In this manner, the text of the partition may be assigned as the potential top-level topic of the ontology for ease of understanding of the content of the documents.

Through the above operations, a top-level of the ontology of the corpus of documents may be generated or determined. However, for each cluster of word sequence embedding vectors or partitions, a recursive technique may be applied to further partition each generated cluster and analyze the partitions of each cluster to derive sub-topics corresponding to the cluster, as illustrated in FIG. 2B. As such, the operations illustrated in FIG. 2B may be performed after the generation of one or more top-level topics of the ontology.

At step 216, the clustered partitions of the corpus of documents generated above may be obtained. In one implementation, the clustered word sequence embedding vectors may be obtained and the corresponding partitions for the clustered vectors may be determined from those vectors. Regardless of how the partitions corresponding to the clusters are obtained, each partition may be further partitioned based on the partitioning techniques discussed above at step 218. In some instances, the parameters of the partitioning may be the same as above. In other instances, the parameters of the partitioning techniques may be adjusted for partitioning portions of the documents that have already been partitioned. For example, a top-level partitioning may be performed as discussed above to partition the documents based on paragraph breaks or other indicators of paragraphs within the document text. To further partition the paragraphs that have been clustered together, one or more parameters may be set to partition based on sentences within the paragraphs, phrases within the paragraphs, lines of text, on a particular number of words, and the like. In another example, the further partitioning may include a rolling window of partitions, as discussed above. In general, the clustered partitions may be further partitioned based on any type of partitioning parameter. Further, in some instances the parameters for further partitioning the clustered partitions may be based on the parameters used above to partition the documents of the corpus. For example, if the documents are partitioned based on paragraphs, the further partitioning may be based on sentences of the text. If the documents are partitioned above based on sentences, however, then the further partitioning may be based on words of the sentences. In this manner, the partitioning of the content of the documents can become more finely grained as the content is partitioned.

At step 220, a word sequence embedding vector may be computed or generated for each of the further partitions of the clustered partitions. As above, the word sequence embedding vectors may be generated through any technique for generating a vector from a block of text, such as the CBOW modeling and the continuous skip-gram modeling that leverage the surrounding context of a word in documents to transform words into vectors. Regardless of the sequence embedding technique utilized, one or more vectors may be generated from the partitions of the documents in the corpus. Also similar to above, one or more clustering techniques may be applied to the generated word sequence embedding vectors to cluster like or similar vectors together at step 222. To cluster the like word sequence embedding vectors, any number or types of clustering algorithms may be applied to the vectors to identify similarities along a variety of factors, such as through a K-means clustering technique, although other clustering techniques are contemplated. In some implementations, the clustering technique may include operations to verify that one or more clustering criteria are met, as described above with relation to steps 208-212 discussed above. In general, the clustering of the vectors corresponding to the further partitions may be repeated until the one or more clustering criteria are met.

At step 224, the clustered vectors corresponding to the further partitions of the documents may then be assigned or otherwise indicated as a sub-topic for the ontology of the corpus of the documents. More particularly and in some instances, the further partitions that are clustered may be assigned as a sub-topic that depends from the top-level topic partition from which the further partitions were taken. For example, a first cluster of partitions may be indicated as a top-level topic for the ontology of the corpus of documents through steps 202-214 described above. In the above example, the top-level topic may be associated with the representations and warranties clause of the contract across the corpus of documents. This first cluster of partitions may be further partitioned and clustered as described in steps 216-222. As the further partitions are taken from the first cluster of partitions, the clustered further partitions maybe identified as a sub-topic to the top-level topic. For example, a sub-topic to the representations and warranties clause of the contract may be the parties listed in the clause, terms listed in the clause, dates listed in the clause, and the like. As the further partitions are generated from the top-level partitions, each sub-topic may be related to a top-level partition. Also, each partition may or may not have a sub-topic, depending the parameters of the clustering technique applied, and each sub-topic may include some indication to the top-level topic to which it may be related.

This process of further partitioning and clustering may be performed recursively until some stopping criteria is met, as illustrated in step 226. The recursive stopping criteria may be any measurable performance of the partitioning and clustering steps discussed above, such as partition lengths, cluster variance, total number of sub-topics, number of sub-topics for each top-level topic (such as at least one sub-topic for each top-level topic), failure to satisfy each clustering parameter, and the like. If the stopping criteria has not been met, the further partitions may be portioned again at step 218 and the process may recursively continue.

Figure 4:
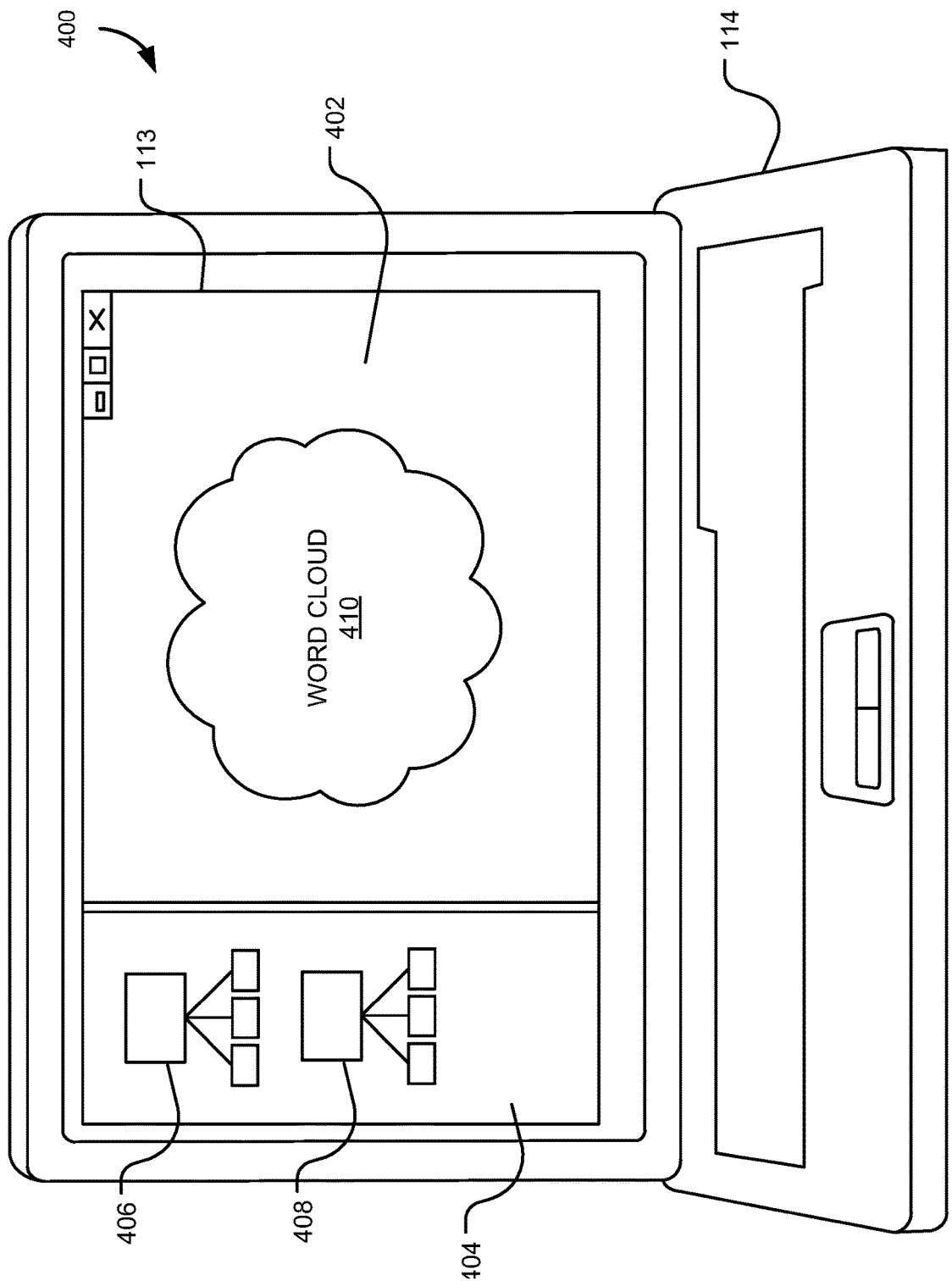
FIG. 4 is an example screenshot of a result of generating an unsupervised document ontology for one or more digital documents, in accordance with various embodiments.

When the stopping criteria is met at step 226, one or more results from the unsupervised and automatic ontology generation process may be returned at step 228. In one implementation, the results of the ontology generating process may be provided to the user interface 113 of the user device 114. For example, FIG. 4 is an example screenshot 400 of a result of generating an unsupervised document ontology for one or more digital documents, in accordance with various embodiments. The example illustrated in FIG. 4 is one potential display of the ontology results generated from the above methods and systems. Other displays and/or values returned based on the above process may also be provided.

As illustrated in FIG. 4, a user interface 113 may be executed and displayed on a display device of a computing device 114. To display the results of the ontology generating methods, the document management platform 106 may communicate with the computing device 114 and provide the results of the ontology generating process, including the determined topics and sub-topics. The computing device 114 may display the results in the user interface 113 shown on the display device. For example and as shown in FIG. 4, the user interface 113 may include a first portion 404 that displays the generated top-level topics and corresponding sub-topics generated through the ontology process. The top-level topics and corresponding sub-topics may be displayed in one or more flow charts 406-408 or tree structures that illustrate which sub-topics relate to which top-level topics. Each displayed flowchart 406-408 may include an indication of a top-level topic and one or more sub-topics that depend from the top-level topic. The top-level topics and sub-topics may be grouped and displayed together to illustrate which top-level topics each sup-topic may relate. Further each top-level topic or sub-topic may include an interactive component or may otherwise be selectable by a user of the computing device 114, such as through an input to the device. As discussed above, each of the top-level topic or sub-topic may be associated with a partition from the corpus of documents. Thus, upon selection of a top-level topic or sub-topic from the first portion 404 through the user interface 113, a corresponding illustration of the content of the corresponding partition may be displayed in a second portion 402 of the user interface. In one particular implementation, the illustration of the content of the corresponding partition to the selected topic may be displayed as a word cloud 410. In general, a word cloud 410 is a visual representation of text in which words that are used more often are shown in a bigger font than words that are used less often. Through the word cloud 410, the words that occur most often in the partition associated with the selected topic or sub-topic may be ascertained in comparison to those words that occur less often in the partition. The word cloud 410 may thus be configured to convey a meaning or context to the partition associated with the topic for a user of the computing device 114. In another implementation, the computing device 114 may obtain or receive a word count for the text or words included in the selected partition and generate the meaning or context of the partition based on the word count. In general, any display that provides a context to a user of the computing device 114 as to the content of the selected partition (based on a topic or sub-topic included in the first portion 404) may be displayed. Other implementations may include a graph of most used words and/or phrases, a visual mapping of the words and/or phrases of the partition to a visual indicator, and/or a simple display of each partition associated with the selected topic or sub-topic may be displayed. In still other implementations, the displayed terms of the partition may include an indicator of the particular document from which the word or phrase was obtained.

As a user of the interface 113 selects different topics illustrated in the first portion 404 of the user interface 113, the word cloud 410 or other illustration of the content of the partition corresponding to the selected topic may be presented in the second portion 402 of the interface. In some instances, however, the content of the identified topics, both the top-level topics and any sub-topics, may be determined automatically with or without display on the user interface 113. For example, the document management platform 106 may analyze the clustered partitions obtained through the methods described above to determine a context or meaning of the partitions. In this manner, a meaning or context for each of the automatically identified top-level topics and sub-topics may be determined for use in generating the ontology of the corpus of documents, with or without presentation to a user through the user interface 113.

Through the systems and methods described herein, an automated machine-learning representation of an ontology of a corpus of documents may be generated. This unsupervised generation of the ontology of the content of the documents may describe, based on the semantics of the language in the corpus and on the structure and format of the documents in that corpus, potentially key differentiable topics and sub-topics within the documents from which a complete ontology for the corpus may be created. The ontology may be both pertinent in defining a structure through which an end user would interpret or "read" the data identified from a document or set of documents and/or to inform machine-learning model or models used to extract document information and classification. Also, the ontology itself may be used as a model in associating topics and creating rule sets for how these topics may be interrelated and what information can be inferred from those relationships FIG. 5 an example computing system 500 that may implement various systems and methods discussed herein. The computer system 500 includes one or more computing components in communication via a bus 502. In one implementation, the computing system 500 includes one or more processors 504. The processor 504 can include one or more internal levels of cache (not depicted) and a bus controller or bus interface unit to direct interaction with the bus 502. Main memory 506 may include one or more memory cards and a control circuit (not depicted), or other forms of removable memory, and may store various software applications including computer executable instructions, that when run on the processor 504, implement the methods and systems set out herein. Other forms of memory, such as a storage device 508 and a mass storage device 512, may also be included and accessible, by the processor (or processors) 504 via the bus 502. The storage device 508 and mass storage device 512 can each contain any or all of an electronic document.

Figure 5:
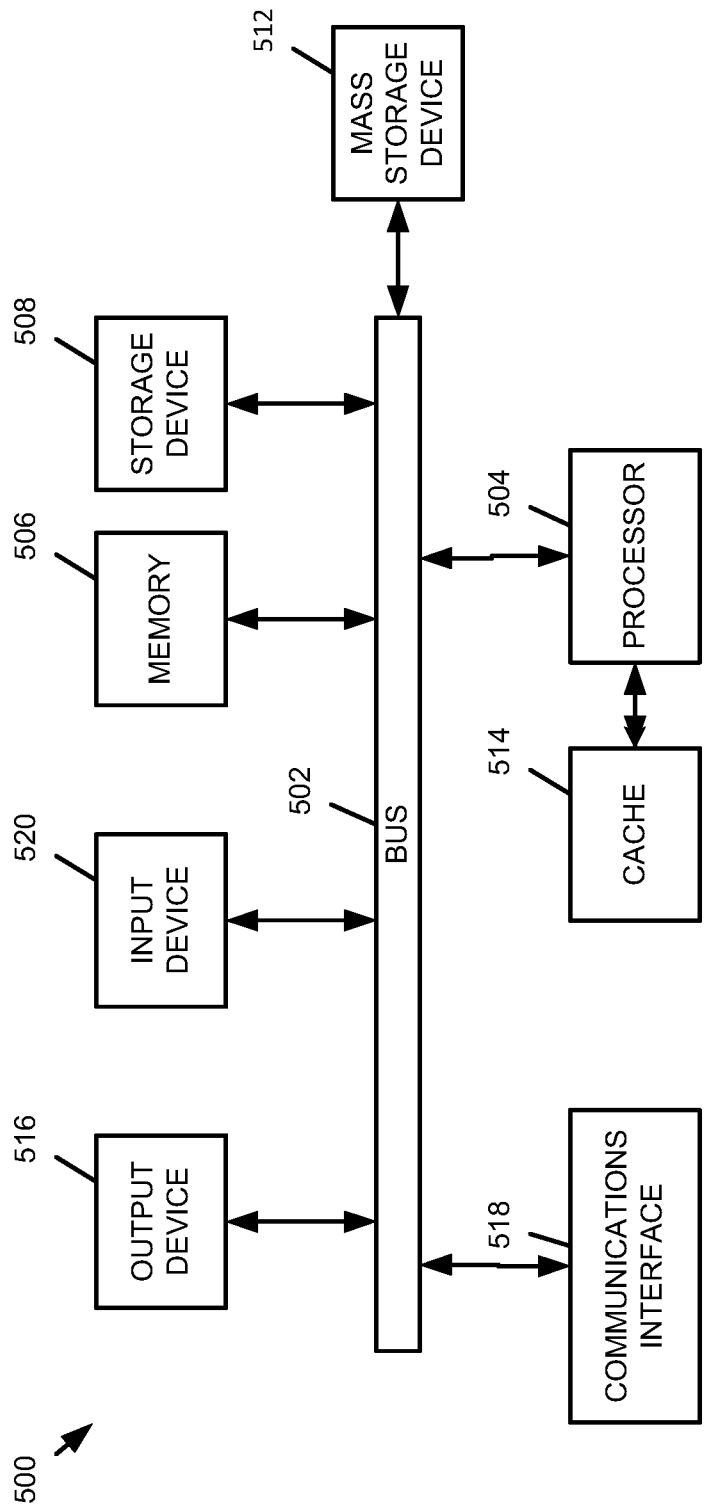
FIG. 5 is a system diagram of an example computing system that may implement various systems and methods discussed herein, in accordance with various embodiments.

The computer system 500 can further include a communications interface 518 by way of which the computer system 500 can connect to networks and receive data useful in executing the methods and system set out herein as well as transmitting information to other devices. The computer system 500 can include an output device 516 by which information is displayed, such as the display 300. The computer system 500 can also include an input device 520 by which information is input. Input device 520 can be a scanner, keyboard, and/or other input devices as will be apparent to a person of ordinary skill in the art. The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for generating an ontology for a corpus of documents, the method comprising:
    accessing, by a processor and from a database, a plurality of electronic documents;
    partitioning, based on a partitioning parameter, each of the plurality of electronic documents into a plurality of partitions;
    computing, by the processor, a word sequence embedding vector for each of the plurality of partitions;
    clustering, based on a clustering parameter, the word sequence embedding vectors into one or more clusters of corresponding vectors by:
        comparing the one or more clusters of corresponding vectors to a clustering criteria value comprising at least one of a number of corresponding vectors in the one or more clusters of corresponding vectors, an indication of each word sequence embedding vector is clustered with another word sequence embedding vector, or an indication of each of the plurality of electronic documents corresponds to at least one of a clustered vector; and
        adjusting, based on the comparison to the clustering criteria value, the clustering parameter; and
    assigning a subset of the plurality of partitions corresponding to a cluster of corresponding vectors to an ontology topic tier for the plurality of electronic documents.

2. The method of claim 1 further comprising:
    partitioning, based on a second partitioning parameter, each of the plurality of partitions into a plurality of sub-partitions;
    computing, by the processor, a word sequence embedding vector for each of the plurality of sub-partitions; and
    clustering, based on a second clustering parameter, the word sequence embedding vectors for each of the plurality of sub-partitions into one or more clusters of corresponding vectors for the plurality of sub-partitions.

3. The method of claim 2 further comprising:
    assigning the plurality of sub-partitions to an ontology sub-topic tier for the plurality of electronic documents, the ontology sub-topic tier dependent on the ontology topic tier.

4. The method of claim 2 further comprising:
    recursively partitioning the plurality of electronic documents and clustering the partitions until a stopping criteria value is obtained.

5. The method of claim 1 wherein the partitioning parameter comprises at least one of partitioning based on a paragraph indicator, partitioning based on a section indicator, or partitioning based on a sentence indicator of the plurality of electronic documents.

6. The method of claim 1 wherein the partitioning parameter comprises a span of x words of the plurality of electronic documents.

7. The method of claim 1 wherein computing the word sequence embedding vector comprises executing a continuous bag-of-word model or a continuous skip-gram model for each of the plurality of partitions.

8. A system for aggregating related documents, the system comprising:
 a processor; and
 a memory comprising instructions that, when executed, cause the processor to:
  partition, based on a partitioning parameter, each of a plurality of electronic documents into a plurality of partitions;
  compute, by the processor, a word sequence embedding vector for each of the plurality of partitions;
  cluster, based on a clustering parameter, the word sequence embedding vectors into one or more clusters of corresponding vectors;
  compare the one or more clusters of corresponding vectors to a clustering criteria value comprising at least one of a number of corresponding vectors in the one or more clusters of corresponding vectors, an indication of each word sequence embedding vector is clustered with another word sequence embedding vector, or an indication of each of the plurality of electronic documents corresponds to at least one of a clustered vector;
  adjust, based on the comparison to the clustering criteria value, the clustering parameter;
  associate a subset of the plurality of partitions corresponding to a cluster of corresponding vectors to an ontology topic tier for the plurality of electronic documents; and
  generate a graphical user interface including a first portion displaying a visual representation of the plurality of partitions.

9. The system of claim 8 wherein the processor is further caused to:
 partition, based on a second partitioning parameter, each of the plurality of partitions into a plurality of sub-partitions;
 compute a word sequence embedding vector for each of the plurality of sub-partitions; and
 cluster, based on a second clustering parameter, the word sequence embedding vectors for each of the plurality of sub-partitions into one or more clusters of corresponding vectors for the plurality of sub-partitions.

10. The system of claim 9 wherein the processor is further caused to:
 assign the plurality of sub-partitions to an ontology sub-topic tier for the plurality of electronic documents, the ontology sub-topic tier dependent on the topic tier.

11. The system of claim 9 wherein the processor is further caused to:
 recursively partition the plurality of electronic documents and clustering the partitions until a stopping criteria value is obtained.

12. One or more non-transitory computer-readable storage media storing computer-executable instructions for performing a computer process on a computing system, the computer process comprising:
 accessing, by a processor and from a database, a plurality of electronic documents;
 partitioning, based on a partitioning parameter, each of the plurality of electronic documents into a plurality of partitions;
 computing, by the processor, a word sequence embedding vector for each of the plurality of partitions;
 clustering, based on a clustering parameter, the word sequence embedding vectors into one or more clusters of corresponding vectors by:
  comparing the one or more clusters of corresponding vectors to a clustering criteria value comprising at least one of a number of corresponding vectors in the one or more clusters of corresponding vectors, an indication of each word sequence embedding vector is clustered with another word sequence embedding vector, or an indication of each of the plurality of electronic documents corresponds to at least one of a clustered vector; and
  adjusting, based on the comparison to the clustering criteria value, the clustering parameter; and
 assigning a subset of the plurality of partitions corresponding to a cluster of corresponding vectors to an ontology topic tier for the plurality of electronic documents.

13. The one or more non-transitory computer-readable storage media of claim 12, the computer process further comprising:
 partitioning, based on a second partitioning parameter, each of the plurality of partitions into a plurality of sub-partitions;
 computing, by the processor, a word sequence embedding vector for each of the plurality of sub-partitions; and
 clustering, based on a second clustering parameter, the word sequence embedding vectors for each of the plurality of sub-partitions into one or more clusters of corresponding vectors for the plurality of sub-partitions.

14. The one or more non-transitory computer-readable storage media of claim 13, the computer process further comprising:
 assigning the plurality of sub-partitions to an ontology sub-topic tier for the plurality of electronic documents, the ontology sub-topic tier dependent on the ontology topic tier.

15. The one or more non-transitory computer-readable storage media of claim 12 wherein the partitioning parameter comprises at least one of partitioning based on a paragraph indicator, partitioning based on a section indicator, or partitioning based on a sentence indicator of the plurality of electronic documents.

* * * * *